Patented Jan. 11, 1949

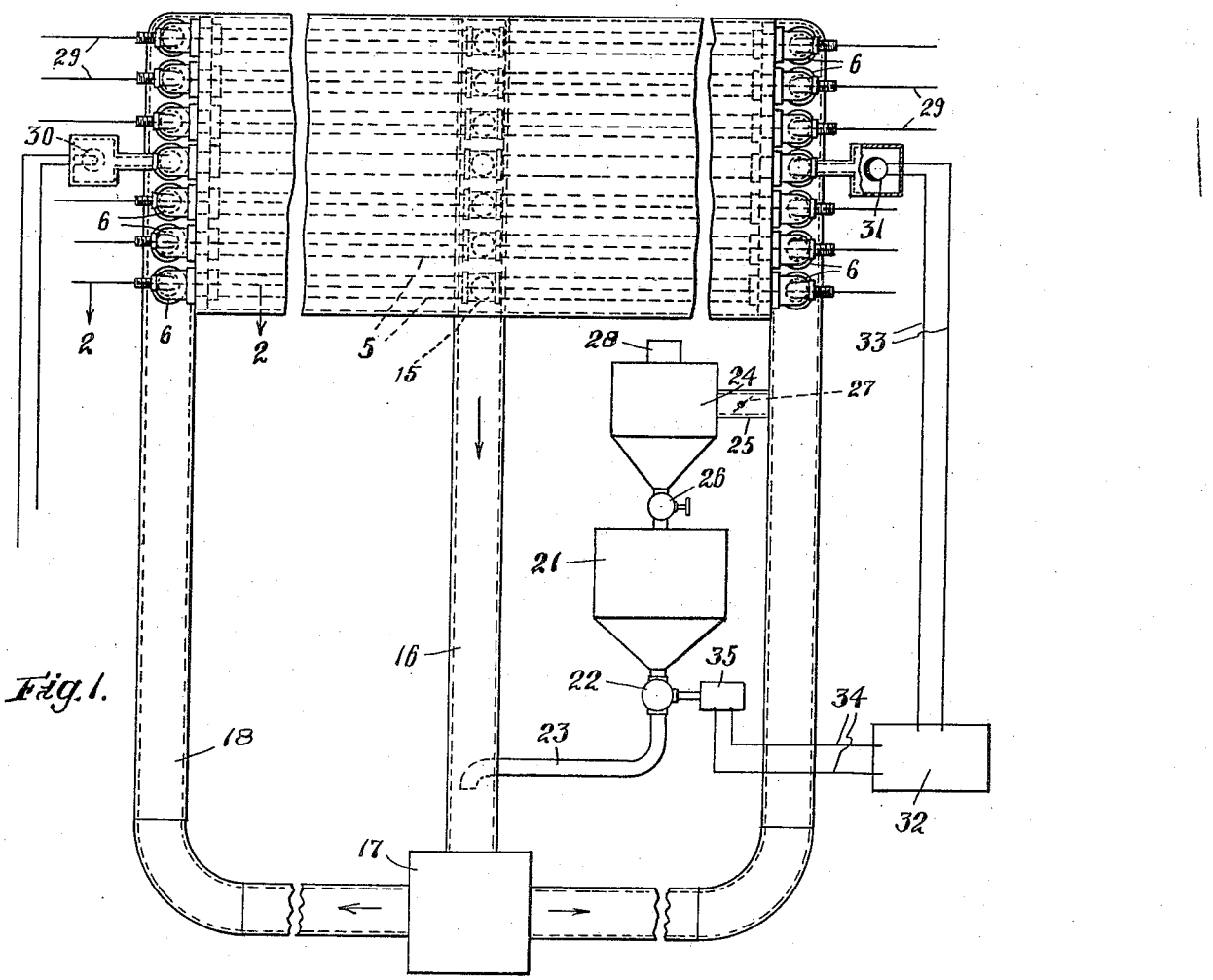
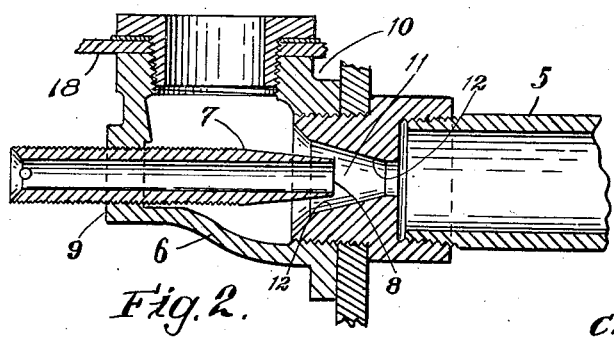

2,458,674

UNITED STATES PATENT OFFICE 2,458,674

DUSTING APPARATUS

Charles E. Blanchard, Randolph, and Albert W. Ferre, Wellesley, Mass., assignors, by mesne assignments, to Westinghouse Electric Corporation, a corporation of Pennsylvania Application January 18, 1944, Serial No. 518,726

6 Claims. (Cl. 91—18)

This invention relates to dusting apparatus such as is used for applying soapstone to rubber covered wire, and this application is a continuation-in-part of our copending application, Serial No. 456,634 which issued as Patent No. 2,358,138 on Sept. 12, 1944.

In the application of soapstone dust to rubber covered wire from a vulcanizer, it is difficult to regulate the feed of dust so that a desired and uniform dust density is maintained at all times. As disclosed in our said application, we have found that by utilizing venturis in the opposite ends of a tube through which the wire passes and by blowing the dust through the venturis which are so arranged that they act as injectors for drawing in, or tending to draw in, air from the apparatus room around the wire at its inlet into, and outlet from, the tube, we were able not only to maintain air seals for preventing the escape of the dust into the apparatus room but by introducing the dust laden air into the opposite ends of the tube around the wire and by withdrawing the air for recirculation from the center of the tube, the dust was deposited more uniformly along the wire.

In this invention, we use several such tubes in parallel with respect to the flow of the dust laden air which is supplied and exhausted through common headers. Wires are passed for dusting through all the tubes but one. A photo-electric cell is so placed at one end of, and a light source of uniform intensity is so placed at the other end of, this one tube that light from the source passes through the dust laden air in the tube and strikes the light sensitive electrode of the cell. The Venturi seals at the ends of the tube prevent the escape of the dust laden air from the openings before which the light source and the photoelectric cell are placed. The photo-electric cell adjusts through an amplifier or relay the supply of dust into the system for maintaining a uniform dust density.

An object of the invention is to maintain a uniform dust density in apparatus for the dusting of rubber covered wire and the like.

The invention will now be described with reference to the drawing, of which:

Fig. 1 is a diagrammatic view of an embodiment of the invention for the dusting of rubber covered wire, and Fig. 2 is a sectional view of one of the venturis which are located in the ends of the dusting tubes of Fig. 1.

Prior dusting systems and apparatus are generally of the type disclosed by the U. S. Patent No. 1,876,251, and this patent may be referred to for those details of well known dusting mechanisms which are not disclosed in detail herein.

Referring now to Fig. 1 of the drawing, the plurality of similar dusting tubes 5 are arranged in parallel with respect to the supply of dust laden air and each tube has in its ends the Venturi heads 6, the details of which are shown by Fig. 2.

As disclosed by Fig. 2, each Venturi head 6 comprises the small tube 7 having the inner restricted nozzle 8. The tube 7 extends through the end wall 9 of the elbow 10 and has its nozzle 8 in the Venturi passage 11 formed between the converging walls 12. The venturis 11 discharge dust into the ends of the tubes 5 as will be described.

The tubes 5 have the outlet openings 15 in or about their longitudinal centers and which open into the recirculated air duct 16. The duct 16 is connected to the inlet of the fan 17. The outlet of the fan 17 connects with the two similar supply ducts 18 which supply dust laden air into the inlets 19 of the elbows 10 of the Venturi heads 6.

The dust hopper 21 supplies soapstone dust through the valve 22 and duct 23 into the recirculated air duct from which it is drawn by the fan 17 and supplied through the ducts 18 into the Venturi heads 6.

The dust collector 24 is connected by the bleeder duct 25 with one of the supply ducts 18, between the Venturi heads 6 and the fan 17. The outlet of the collector 24 discharges dust collected therein, through the valve 26 into the hopper 21. The damper 27 regulates the volume of dust laden air bled from the system. The dust free air is discharged through the duct 28 into the apparatus room.

The rubber covered wires 29 are advanced centrally through all of the Venturi tubes 7 in the ends of the dusting tubes 5 except those in one tube which is illustrated by Fig. 1 as being the center tube 5. An electric light source 30 is aligned with the center of this tube 5 at one end thereof and the photo-electric cell 31 is aligned with the center of this tube 5 at the other end thereof so that light from the source 30 passes through the tube and strikes the cathode of the cell 31.

The amplifier 32 is connected by the wires 33 to the output of the cell 31 and is connected by the wires 34 to the solenoid 35 which adjusts the valve 22.

In operation, the dust laden air passes into the Venturi heads 6 where its velocity is increased so that it issues in high velocity jets centrally around the wires 5. The jets from the opposite heads 6 meet at the centers of the tubes 5, and are drawn into the recirculated air duct 16. The wires 29 are thus encircled by dust laden air the entire lengths of the tubes 5 so that dust is deposited upon the wires during their passage through the tubes. As the wires near the leaving ends of the tubes, the velocity of the air which had decreased near the centers thereof, is increased again to a high velocity and blows excess dust from the wires.

Dust is prevented from escaping into the apparatus room at the ends of the tubes 5, by the induction action of the dust laden air passing the ends of the nozzles 8. Air from the apparatus room is drawn through the tubes 7 into the dusting tubes 5 and air seals are thus formed. The position of the tubes 7 in the Venturi heads 6 is adjustable for varying the induction effect. The tubes 7 and the damper 27 may be adjusted for air balance while maintaining the desired velocities in the tubes 5.

The photo-electric cell 31 responds to variations in the dust density in the tubes 5 and adjusts through the valve 22 the feed of the dust from the hopper 21 into the system for maintaining the desired density.

An advantage of this invention is that by arranging a photo-electric cell and a light source at the opposite ends of a tube so that a light beam is projected along the length of the interior of the tube, a more accurate specimen is obtained indicative of the dust density, than would be obtained by projecting a light beam to a photoelectric cell transverse the interior of the tube.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. In dusting apparatus a tube, means for supplying dust laden air into said tube, a light source at one end of said tube, a photo-electric cell at the other end of said tube, and means responsive to electric current variations from said cell caused by variations in the dust density in said tube for adjusting said supplying means.

2. In dusting apparatus a tube, means for supplying dust laden air into the opposite end of said tube, a light source at one end of said tube, a photo-electric cell at the other end of said tube, and means responsive to electric current variations from said cell caused by variations in the dust density in said tube for adjusting said supplying means.

3. In dusting apparatus a tube, Venturi heads in the opposite ends of said tube, a dust supply hopper, means for supplying dust from said hopper into said heads, a light source at one of said heads, a photo-electric cell at the other of said heads, and means responsive to electric current variations from said cell caused by variations in the dust density in said tube for regulating the supply of dust from said hopper to said supplying means.

4. In dusting apparatus a tube, Venturi heads in the opposite ends of said tube, a dust supply hopper, means including a fan for supplying dust from said hopper into said heads, means for recirculating air from substantially the center of said tube into said fan, a light source at one of said heads, a photo-electric cell at the other of said heads, and means responsive to electric current variations from said cell caused by variations in the dust density in said tube for regulating the supply of dust from said hopper to said supplying means.

5. In dusting apparatus a tube, Venturi heads in the opposite ends of said tube, a dust supply hopper, means including a fan for supplying dust from said hopper into said heads, means for recirculating air from substantially the center of said tube into said fan, a light source at one of said heads, a photo-electric cell at the other of said heads, and means responsive to electric current variations from said cell caused by variations in the dust density in said tube for regulating the supply of dust from said hopper to said supplying means, said Venturi heads including means forming air seals for preventing the escape of dust laden air through said venturis into the apparatus room.

6. In dusting apparatus a tube, Venturi heads in the opposite ends of said tube, a dust supply hopper, means including a fan for supplying dust from said hopper into said heads, means for recirculating air from substantially the center of said tube into said fan, a light source at one of said heads, a photo-electric cell at the other of said heads, and means responsive to electric current variations from said cell caused by variations in the dust density in said tube for regulating the supply of dust from said hopper to said supplying means, said Venturi heads including means inducing air from the apparatus room into said tube for forming air seals for preventing the escape of dust laden air through said venturis into said room.

CHARLES E. BLANCHARD.
ALBERT W. FERRE.

REFERENCES CITED

The following references are of record in the file of this patent:

UNITED STATES PATENTS

| Number | Name | Date |
|---|---|---|
| 1,002,635 | Bratkowski | Sept. 5, 1911 |
| 1,263,858 | Cole | Apr. 23, 1918 |
| 1,876,251 | Lehman | Sept. 6, 1932 |
| 2,185,361 | Townes | Jan. 2, 1940 |
| 2,281,169 | Pattison | Apr. 28, 1942 |
| 2,358,138 | Blanchard et al. | Sept. 12, 1944 |